United States Patent
Ma et al.

(10) Patent No.: US 10,594,429 B2
(45) Date of Patent: Mar. 17, 2020

(54) DATA SENDING AND RECEIVING METHOD, AND DATA SENDING AND RECEIVING DEVICE

(71) Applicant: NTT DOCOMO INC., Tokyo (JP)

(72) Inventors: Ruifeng Ma, Beijing (CN); Liu Liu, Beijing (CN); Qin Mu, Beijing (CN); Huiling Jiang, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 25 days.

(21) Appl. No.: 15/574,111

(22) PCT Filed: May 13, 2016

(86) PCT No.: PCT/CN2016/082096
§ 371 (c)(1),
(2) Date: Nov. 14, 2017

(87) PCT Pub. No.: WO2016/180369
PCT Pub. Date: Nov. 17, 2016

(65) Prior Publication Data
US 2018/0351681 A1  Dec. 6, 2018

(30) Foreign Application Priority Data

May 14, 2015 (CN) .......................... 2015 1 0246653

(51) Int. Cl.
*H04W 4/70* (2018.01)
*H04J 13/00* (2011.01)
(Continued)

(52) U.S. Cl.
CPC ............ *H04J 13/0003* (2013.01); *H04L 1/08* (2013.01); *H04L 27/34* (2013.01); *H04W 4/70* (2018.02); *H04W 72/042* (2013.01)

(58) Field of Classification Search
None
See application file for complete search history.

(56) References Cited

U.S. PATENT DOCUMENTS

2006/0291582 A1  12/2006  Walton et al.
2010/0046681 A1   2/2010  van Nee
(Continued)

FOREIGN PATENT DOCUMENTS

CN  101483463 A    7/2009
CN  101521529 A *  9/2009  .............. H04W 4/70
(Continued)

OTHER PUBLICATIONS

English Translation of the International Preliminary Report on Patentability for PCT/CN2016/082096, IB, Geneva, issued Nov. 14, 2017, incorporating the English translation of the Written Opinion of the ISA for PCT/CN2016/082096, ISA/CN, dated Jul. 29, 2016.
(Continued)

*Primary Examiner* — Kouroush Mohebbi
(74) *Attorney, Agent, or Firm* — Harness, Dickey & Pierce, P.L.C.

(57) ABSTRACT

Provided are a data transmitting method, a data receiving method, a data transmitting device and a data receiving device. The data transmitting method comprises: modulating data in a first modulation manner to generate a first symbol stream; decomposing the first symbol stream into a pre-determined number of second symbol streams, each of which is modulated in a modulation manner with a modulation order lower than a modulation order of the first modulation manner; processing the pre-determined number of second symbol streams to generate a code-division-multiplexed data stream; and processing the code-division-multiplexed data stream to send the processed data stream. With the methods and the devices, reliability for data transmission can be improved.

12 Claims, 5 Drawing Sheets

(51) Int. Cl.
*H04L 1/08* (2006.01)
*H04L 27/34* (2006.01)
*H04W 72/04* (2009.01)

(56) References Cited

U.S. PATENT DOCUMENTS

| | | | |
|---|---|---|---|
| 2011/0176500 A1* | 7/2011 | Wager | H04W 74/006 370/329 |
| 2011/0235751 A1 | 9/2011 | Liang et al. | |
| 2013/0142160 A1 | 6/2013 | Hoshino et al. | |

FOREIGN PATENT DOCUMENTS

| | | | | |
|---|---|---|---|---|
| CN | 101834694 A | | 9/2010 | |
| CN | 104038324 A | * | 9/2014 | H04W 4/70 |
| CN | 104038624 A | | 9/2014 | |

OTHER PUBLICATIONS

3rd Generation Partnership Project. "3rd Generation Partnership Project; Technical Specification Group Radio Access Network; Evolved Universal Terrestrial Radio Access (E-UTRA); Multiplexing and channel coding (Release 12)" 3GPP TS 36.212.4.0.Mar. 31, 2015 (Mar. 31, 2015) pp. 57-83.

International Search Report for PCT/CN2016/082096, ISA/CN, Haidian District, Beijing, dated Jul. 29, 2016 with English translation.

Written Opinion of the ISA for PCT/CN2016/082096, ISA/CN, Haidian District, Beijing, dated Jul. 29, 2016, with English translation.

\* cited by examiner

DATA SENDING AND RECEIVING METHOD, AND DATA SENDING AND RECEIVING DEVICE

CROSS-REFERENCE TO RELATED APPLICATIONS

This application is a 371 U.S. National Stage of International Application No. PCT/CN2016/082096, filed May 13, 2016, which claims the benefit of and priority to Chinese Patent Application No. 201510246653.2, filed May 14, 2015. The entire disclosures of the above applications are incorporated herein by reference.

TECHNICAL FIELD

The present invention relates to a field of wireless communication, and in particular to a data transmitting method, a data receiving data, a data transmitting device and a data receiving device that can be used in a wireless communication system, especially a machine-type communication (MTC) system.

BACKGROUND

Machine-type communication (MTC) is a machine-to-machine (M2M) communication technology for transmitting data via a wireless network, and can be applied to fields, such as smart grid and intelligent transportation. 3GPP (Third Generation Partnership Project) is studying and standardizing MTC.

A research hotspot of MTC is coverage enhancement (CE). By increasing coverage of MTC, MTC can be applied to more occasions. A technology for increasing the coverage of MTC has been proposed, by which data to be sent is repeatedly sent for a number of times in a time period, thereby improving the reliability for data transmission and thus increasing the coverage of MTC. However, repeatedly transmitting data for a number of times will inevitably lead to extra power consumption and reduce spectrum efficiency. As the number of times for which data is repeatedly sent is increased, this problem will become more severe.

SUMMARY

According to one embodiment of the present invention, there is provided a data transmitting method, comprising: modulating data in a first modulation manner to generate a first symbol stream; decomposing the first symbol stream into a pre-determined number of second symbol streams, each of which is modulated in a modulation manner with a modulation order lower than that of the first modulation manner; processing the pre-determined number of second symbol streams to generate a code-division-multiplexed data stream; and processing the code-division-multiplexed data stream to send the processed data stream.

According to another embodiment of the present invention, there is provided a data receiving method, comprising: receiving data and processing the received data to obtain a code-division-multiplexed data stream; processing the code-division-multiplexed data stream to generate a pre-determined number of first symbol streams; combining the pre-determined number of first symbol streams into a second symbol stream, wherein the second symbol stream is modulated in a modulation manner with a modulation order higher than that of each of the first symbol streams; and demodulating the second symbol stream to generate a demodulated data stream.

According to another embodiment of the present invention, there is provided a data transmitting device, comprising: a modulation apparatus configured to modulate data in a first modulation manner to generate a first symbol stream; a decomposing apparatus configured to decompose the first symbol stream into a pre-determined number of second symbol streams, each of which is modulated in a modulation manner with a modulation order lower than that of the first modulation manner; a processing apparatus configured to process the pre-determined number of second symbol streams to generate a code-division-multiplexed data stream; and a communication apparatus configured to process the code-division-multiplexed data stream to send the processed data stream.

According to another embodiment of the present invention, there is provided a data receiving device, comprising: a communication apparatus configured to receive data and processing the received data to obtain a code-division-multiplexed data stream; a processing apparatus configured to process the code-division-multiplexed data stream to generate a pre-determined number of first symbol streams; a combination apparatus configured to combine the pre-determined number of first symbol streams into a second symbol stream, wherein the second symbol stream is modulated in a modulation manner with a modulation order higher than a modulation manner of each of the first symbol streams; and a demodulation apparatus configured to demodulate the second symbol stream to generate a demodulated data stream.

With the methods and the devices according to the above-mentioned embodiments of the present invention, a symbol stream modulated in a high-order modulation manner can be decomposed into a plurality of symbol streams modulated in a low-order modulation manner, then the plurality of symbol streams are transmitted in a code division multiplexing manner, thereby improving reliability for data transmission and thus reducing the number of times for repeated transmission.

BRIEF DESCRIPTION OF THE DRAWINGS

The above-mentioned and other objectives, features and advantages of the present invention will become more apparent by describing the embodiments of the present invention in detail in conjunction with the accompanying drawings, in which.

DETAILED DESCRIPTION OF THE EMBODIMENTS

Figure 1A:
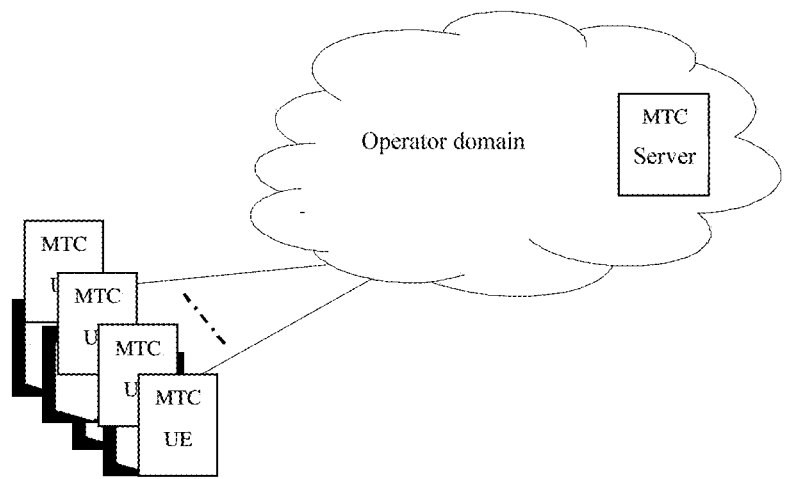
FIGS. 1A and 1B show an example of a machine-type communication (MTC) system where embodiments of the present invention can be applied.

Embodiments of the present invention are described below with reference to the accompanying drawings. Like reference numerals represent like elements throughout the drawings. It should be understood that the embodiments described herein are merely illustrative, but should not be interpreted to limit a scope of the present invention.

Firstly, an example of an MTC system in which the embodiments of the present invention can be applied is described with reference to FIGS. 1A and 1B.

Figure 1B:
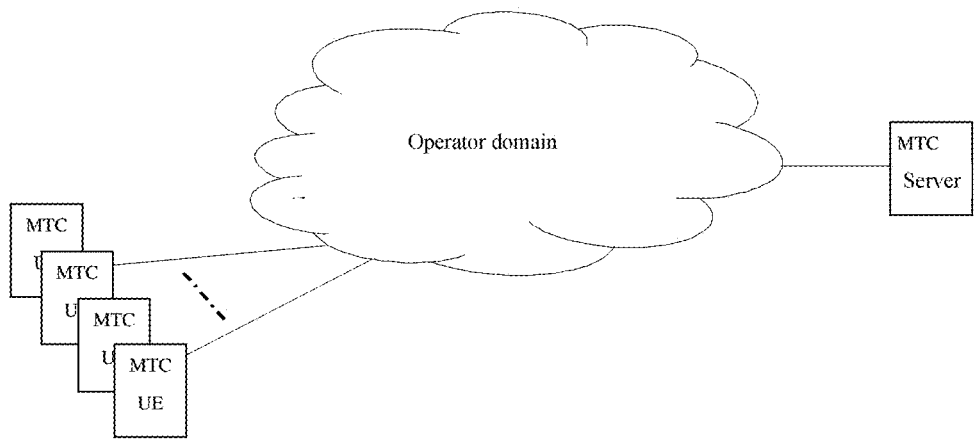

The example of the MTC system shown in FIG. 1A comprises an MTC server (or base station) and an MTC user equipment (UE), where the MTC server is located within a domain controlled by a communication operator and communicates with the UE via a wireless network or other networks provided by the operator. The example of the MTC system shown in FIG. 1B comprises an MTC server and a UE, where the MTC server is located outside a domain controlled by a communication operator and communicates with the UE via a wireless network or other networks provided by the operator. Specifically, the UE can transmit a physical uplink shared channel (PUSCH) to the MTC server via the network and receive a physical downlink shared channel (PDSCH) from the MTC server. It should be appreciated that the numbers of the MTC server and the UEs shown in FIGS. 1A and 1B are exemplary, and there may be more MTC servers and more or less UEs if necessary.

A data transmitting method according to the embodiment of the present invention is described below with reference to FIG. 2. The method may be performed by a UE, or may be performed by an MTC server. Hereinafter, the embodiment of the present invention is described by taking execution of the method by the UE as an example; however, the description can also be applied to the MTC server after appropriate adjustments.

Figure 2:
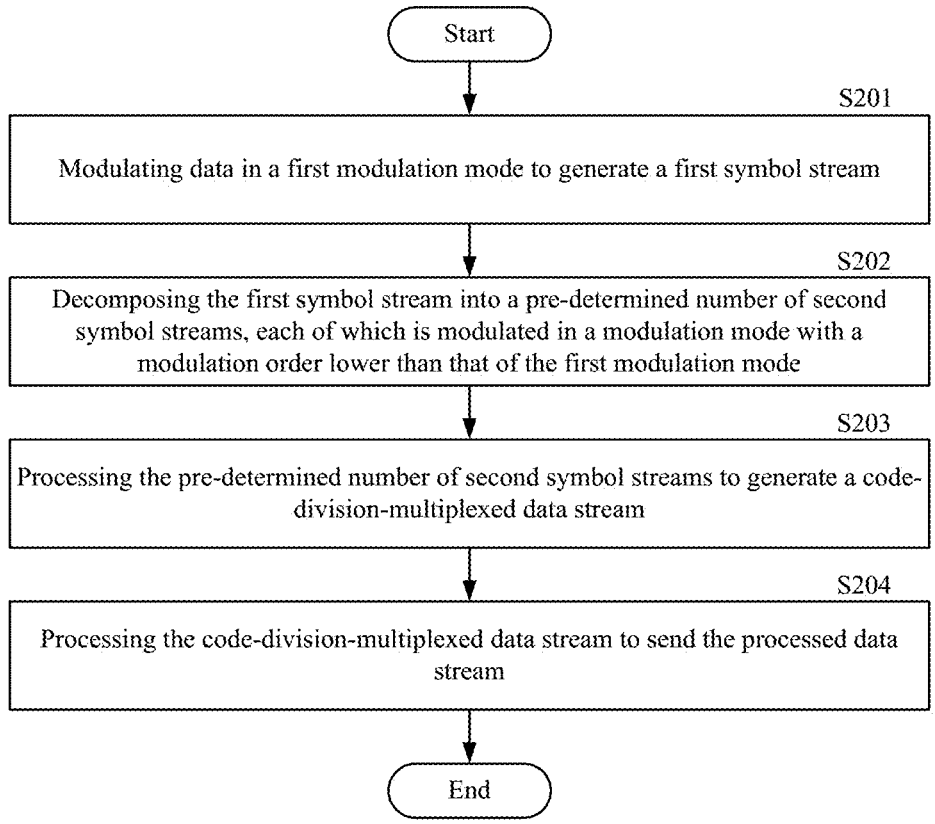
FIG. 2 shows a flow chart of a data transmitting method according to an embodiment of the present invention.

With reference to FIG. 2, in step S201, the data can be modulated in a first modulation manner to generate a first symbol stream. The data described herein may be data generated by scrambling MTC service data to be transmitted, or may be other data.

The first modulation manner may be a high-order modulation manner, for example, a modulation manner with a modulation order greater than 2, and may be, for example, QPSK, 16QAM or 64QAM, etc. The first modulation manner can be selected according to a channel quality between the MTC server and the UE. For example, when the channel quality is good, a higher-order modulation manner, for example 16QAM or 64QAM, can be selected, whereas when the channel quality is poor, a lower-order modulation manner, for example QPSK, can be selected. An appropriate modulation manner can also be selected according to actual requirements or other factors, as the first modulation manner. The selection of the first modulation manner may be performed by the UE and notified to the MTC server, or may be performed by the MTC server and notified to the UE. Alternatively, the first modulation manner can be set in advance in the MTC server and the UE.

In step S202, the first symbol stream can be decomposed into a pre-determined number of second symbol streams. Each of the second symbol streams is modulated in a modulation manner with a modulation order lower than that of the first modulation manner. That is to say, one high-order-modulated symbol stream (first symbol stream) can be decomposed into a plurality of low-order-modulated symbol streams (second symbol streams). Hereinafter, in order to facilitate description, the pre-determined number is represented by N with N>1.

The pre-determined number N can be determined according to the modulation order of the first modulation manner and/or design requirements. N is less than or equal to the modulation order of the first modulation manner. For example, if the first modulation manner is 16QAM, the modulation order thereof is 4, then N can be 2 or 4, and if the first modulation manner is 64QAM, the modulation order thereof is 6, then N can be 3 or 2. N can be determined by the MTC server, and information indicating N may be sent to the UE via semi-static signalling, such as radio resource control (RRC) signalling, or other signalling, so that the UE receives the information indicating N via the RRC signalling. Alternatively, N can be determined by the UE, and is notified to the MTC server via appropriate signalling.

In addition, modulation manners of the respective second symbol streams can be determined according to the modulation order of the first modulation manner and N and/or other factors. Briefly, a sum of modulation orders of the modulation manners of the respective second symbol streams is equal to the modulation order of the first modulation manner. The modulation manners of the respective second symbol streams may be the same. For example, in the case where the first modulation manner is 16QAM and N is 2, the modulation manners of the respective second symbol streams may be determined to be QPSK, so that a 16QAM symbol stream which is the first symbol stream may be decomposed into two QPSK symbol streams which are the second symbol streams, or the modulation manners of the respective second symbol streams may also be determined to be BPSK, so that the 16QAM symbol stream which is the first symbol stream may be decomposed into four BPSK symbol streams which are the second symbol streams. In the case where the first modulation manner is 64QAM and N is 3, the modulation manners of the respective second symbol streams may be determined to be QPSK, so that a 64QAM symbol stream which is the first symbol stream may be decomposed into three QPSK symbol streams which are the second symbol streams. Alternatively, the modulation manners of the respective second symbol streams may be different. For example, in the case where the first modulation manner is 64QAM and N is 2, a modulation manner of one second symbol stream may be determined to be QPSK, and a modulation manner of another second symbol stream may be determined to be 16QAM, so that a 64QAM symbol stream which is the first symbol stream may be decomposed into one QPSK symbol stream and one 16QAM symbol stream which are the second symbol streams. The modulation manners of the respective second symbol streams may be determined by the MTC server, and are notified to the UE via various signalling, such as the RRC signalling. The modulation manners of the respective second symbol streams may also be determined by the UE, and are notified to the MTC server via signalling.

The UE can decompose the first symbol stream according to the pre-determined number N and the modulation manners of the respective second symbol streams. For example, in the case where the 16QAM symbol stream which is the first symbol stream is decomposed into two QPSK symbol streams which are the second symbol streams, since each symbol of the 16QAM symbol stream corresponds to 4 bits while each symbol of the QPSK symbol streams corresponds to 2 bits, first two bits in every four bits of the 16QAM symbol stream can be extracted as two bits of the first QPSK symbol stream, and last two bits in the four bits can be extracted as two bits of the second QPSK symbol stream, until all bits of the 16QAM symbol stream are extracted. In the case where the 64QAM symbol stream which is the first symbol stream is decomposed into one QPSK symbol stream and one 16QAM symbol stream, since each symbol of the 64QAM symbol stream corresponds to 6 bits, each symbol of the QPSK symbol stream corresponds to 2 bits, and each symbol of the 16QAM symbol stream corresponds to 4 bits, first two bits in every six bits of the 64QAM symbol stream can be extracted as 2 bits of the QPSK symbol stream, and last four bits in the six bits can be extracted as 4 bits of the 16QAM symbol stream, until all bits of the 64QAM symbol stream are extracted. Of course, in this case, first four bits in every six bits of the 64QAM symbol stream can also be extracted as 4 bits of the 16QPSK symbol stream, and last two bits in the six bits can be extracted as 2 bits of QPSK symbol stream, until all bits of the 64QAM symbol stream are extracted.

Transmission powers can be assigned to the respective second symbol streams, so as to satisfy that a total transmission power of the respective second symbol streams is the same as a transmission power of the first symbol stream, and the transmission powers of the respective second symbol streams can be the same or different. For example, in the case where the 16QAM symbol stream is decomposed into two QPSK symbol streams, the transmission powers of the respective QPSK symbol streams can be the same, and are respectively halves of the transmission power of the 16QAM symbol stream. In the case where the 64QAM symbol stream is decomposed into one QPSK symbol stream and one 16QAM symbol stream, the transmission power of the QPSK symbol stream may be the same as the transmission power of the 16QAM symbol stream and is a half of the transmission power of the 64QAM symbol stream, or the transmission power of the QPSK symbol stream may be a half of the transmission power of the 16QAM symbol stream and a sum of the two transmission powers is equal to the transmission power of the 64QAM symbol stream. In certain cases, a total transmission power of the respective second symbol streams may be not equal to the transmission power of the first symbol stream.

Still referring to FIG. 2, in step S203, the N second symbol streams can be processed to generate a code-division-multiplexed data stream. Each of the second symbol streams corresponds to a layer of the code division multiplexing.

In the embodiment, the processing can comprise repeating and code division multiplexing. Briefly, the N second symbol streams can be respectively repeated in a pre-determined unit for a pre-determined number of times, so as to generate N repeated symbol streams. Then, code division multiplexing can be performed on the N repeated symbol streams to generate the code-division-multiplexed data stream.

Figure 3:
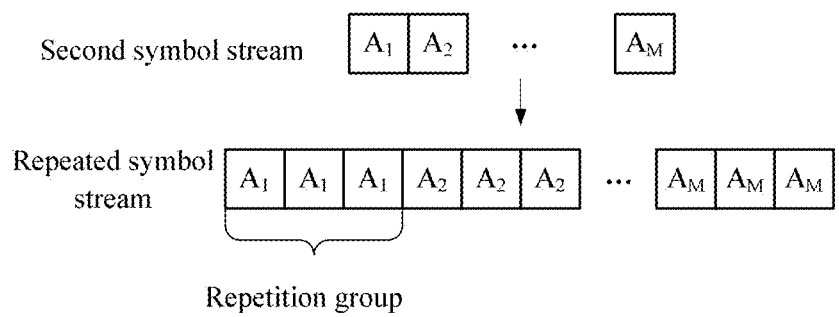
FIG. 3 shows a schematic diagram of generating a repeated symbol stream from a second symbol stream.

Specifically, firstly, each of the second symbol streams can be respectively repeated in the pre-determined unit for a pre-determined number of times, so as to generate a corresponding repeated symbol stream. Hereinafter, the pre-determined unit may also be referred to as a pre-determined repeating unit, and the pre-determined number of times may also be referred to as a pre-determined number of repetition times. Assuming that the pre-determined number of repetition times is $N_R$, in each of the repeated symbol streams, $N_R$ pre-determined repeating units form a repetition group. The pre-determined repeating unit may be a symbol, i.e. each of the second symbol streams is repeated in a unit of symbol. The pre-determined repeating unit may also be a sub-frame, i.e. each of the second symbol streams is repeated in a unit of sub-frame. As an example, if the pre-determined repeating unit is a symbol and $N_R$ is 3, then for each of the second symbol streams, each of its symbols can be repeated for three times, thereby forming a corresponding repeated symbol stream, where each repetition group of the repeated symbol stream comprises 3 symbols. FIG. 3 shows the example. As shown in FIG. 3, for the second symbol streams $A_1, A_2, \ldots A_M$, the corresponding repeated symbol streams are $A_1, A_1, A_1, A_2, A_2, A_2, \ldots A_M, A_M, A_M$, i.e. each symbol is repeated for 3 times to form a repetition group. As another example, if the pre-determined repeating unit is a sub-frame and $N_R$ is 5, for each of the second symbol streams, a symbol corresponding to each sub-frame can be repeated for 5 times so as to form a corresponding repeated symbol stream, where one repetition group of the repeated symbol stream comprises 5 sub-frames. Compared with repetition in a unit of sub-frame, repetition in a unit of symbol only requires to store fewer symbols, thereby needing a smaller buffer length. In the embodiment, the pre-determined repeating unit and/or the pre-determined number of repetition times can be determined by the MTC server, and is/are notified to the UE. For example, the pre-determined repeating unit can be determined according to actual requirements or other factors, and the pre-determined number of repetition times can be determined according to actual requirements or other factors (for example, the reliability or coverage to be achieved). Then, the MTC server can notify the UE of information indicating the pre-determined repeating unit and/or information indicating the pre-determined number of repetition times via semi-static signalling, such as RRC signalling, or other signalling. Alternatively, the pre-determined repeating unit and/or the pre-determined number of repetition times can be determined by the UE, and is notified to the MTC server via signalling. Or, the pre-determined repeating unit and/or the pre-determined number of repetition times can also be set in advance in the MTC server and the UE.

After the N repeated symbol streams are obtained, code division multiplexing can be performed on the N repeated symbol streams, so as to generate the code-division-multiplexed data stream.

Specifically, each repeating unit in repetition groups in each repeated symbol stream can be multiplied by a corresponding spreading sequence, so as to generate a data stream of a corresponding code division multiplexing layer. For example, a spreading sequence corresponding to each repeating unit in repetition groups in each repeated symbol stream can be determined according to formula (1) below:

$$s_{n_{layer},n_{repunit}} = \exp\left(-j \cdot \frac{2\pi}{N_R} \cdot n_{layer} \cdot n_{repunit}\right) \quad (1)$$

where $n_{layer}$ represents a number of each repeated symbol stream (or corresponding second symbol stream), i.e. a number of a code division multiplexing layer corresponding to each repeated symbol stream, with $n_{layer} \leq N \leq N_R$, $n_{repunit}$ represents a number of the repeating unit in the repetition group, then $s_{n_{layer},n_{repunit}}$ represents a spreading sequence corresponding to an $n_{repunit}$-th repeating unit in a repetition group of an $n_{layer}$-th repeated symbol stream. For to the N repeated symbol streams, the following spreading sequence matrix can be determined using formula (1) above:

$$\begin{bmatrix} \exp\left(-j \cdot \frac{2\pi}{N_R} \cdot 1 \cdot 1\right) & \exp\left(-j \cdot \frac{2\pi}{N_R} \cdot 1 \cdot 2\right) & \cdots & \exp\left(-j \cdot \frac{2\pi}{N_R} \cdot 1 \cdot N_R\right) \\ \exp\left(-j \cdot \frac{2\pi}{N_R} \cdot 2 \cdot 1\right) & \exp\left(-j \cdot \frac{2\pi}{N_R} \cdot 2 \cdot 2\right) & \cdots & \exp\left(-j \cdot \frac{2\pi}{N_R} \cdot 2 \cdot N_R\right) \\ \vdots & \vdots & \ddots & \vdots \\ \exp\left(-j \cdot \frac{2\pi}{N_R} \cdot N \cdot 1\right) & \exp\left(-j \cdot \frac{2\pi}{N_R} \cdot N \cdot 2\right) & \cdots & \exp\left(-j \cdot \frac{2\pi}{N_R} \cdot N \cdot N_R\right) \end{bmatrix}$$

Figure 4:
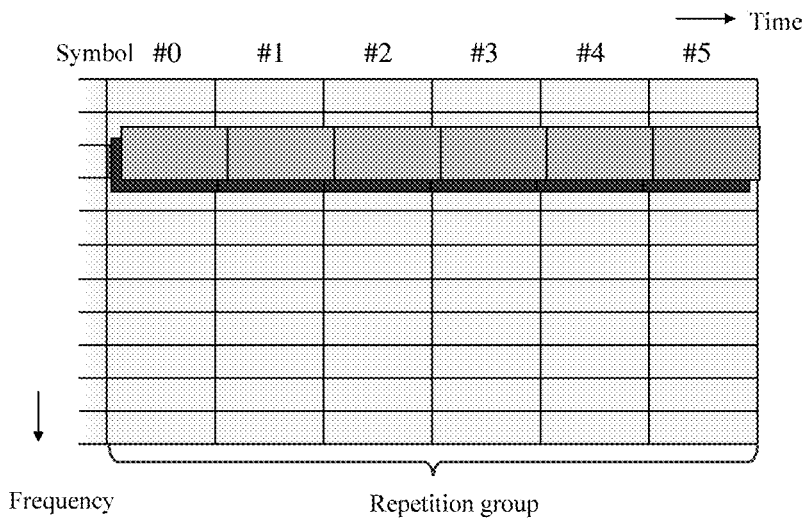
FIG. 4 shows an example of data streams of a plurality of code division multiplexing layers obtained when a repeating unit is a symbol.
Figure 5:
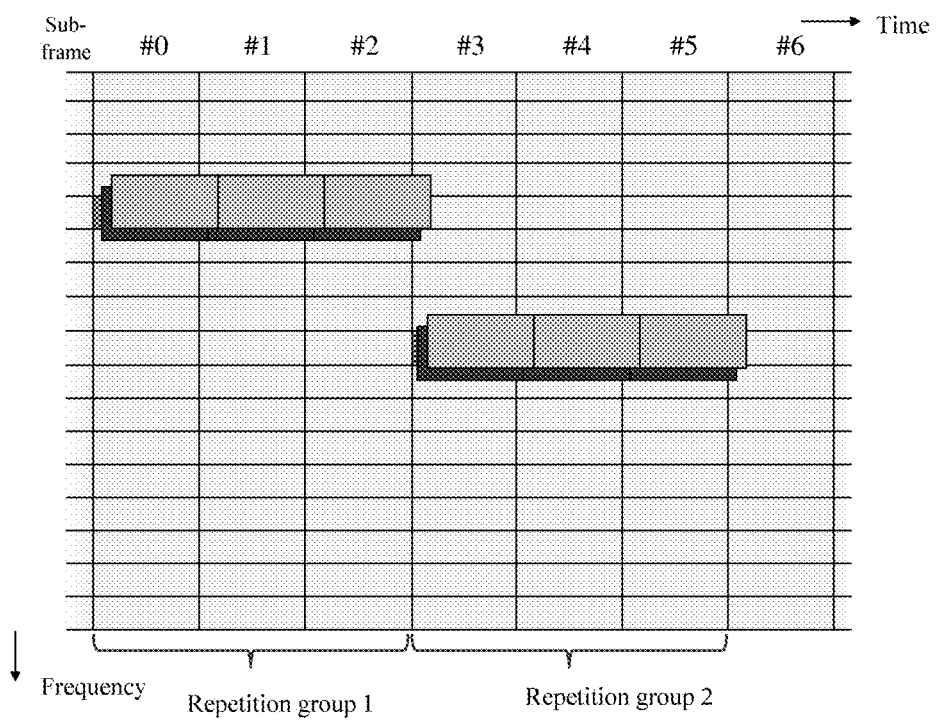
FIG. 5 shows an example of data streams of a plurality of code division multiplexing layers obtained when a repeating unit is a sub-frame.

Thus, respective repeating units in each repetition group of a first repeated symbol stream can be respectively multiplied by corresponding spreading sequences in a first row in the matrix above, so as to generate data streams of a first code division multiplexing layer; respective repeating units in each repetition group of a second repeated symbol stream can be respectively multiplied by corresponding spreading sequences in a second row in the matrix above, so as to generate data streams of a second code division multiplexing layer, and so on. FIG. 4 shows an example of data streams of a plurality of code division multiplexing layers obtained when the repetition unit is a symbol and $N_R$ is 6. FIG. 5 shows an example of data streams of a plurality of code division multiplexing layers obtained when the repetition unit is a sub-frame and $N_R$ is 3, and frequency hopping is applied in the example.

Then, the data streams of the N code division multiplexing layers obtained thereby can be added to generate the code-division-multiplexed data stream.

Still referring to FIG. 2, in step S204, the code-division-multiplexed data stream is processed to send a processed data stream. The processing to be performed can be selected according to actual requirements. For example, the processing can comprise resource unit mapping processing for mapping the code-division-multiplexed data stream to resource units and/or processing for generating a single-carrier frequency division multiple access (SC-FDMA) signal for transmission. The processing may also comprise other types of processing when necessary. Of course, the above-mentioned processing may be not performed on the code-division-multiplexed data stream, instead, the code-division-multiplexed data stream is transmitted directly.

With the above-mentioned method, a symbol stream modulated in a high-order modulation manner can be converted into a plurality of symbol streams modulated in a low-order modulation manner, then the plurality of symbol streams are sent in a code division multiplexing manner. Since the low-order modulated symbol streams have a higher reliability than the high-order modulated symbol stream, and orthogonality is introduced through the orthogonal spreading sequences when the code division multiplexing is performed, the reliability for data transmission can be improved, in turn the number of times for repeated transmission may be reduced and the coverage may be increased.

Figure 6A:
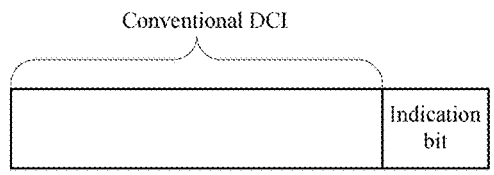
FIGS. 6A and 6B show a schematic diagram of a method for transmitting, via PDCCH, an indication bit for indicating whether to perform code division multiplexing.
Figure 6B:
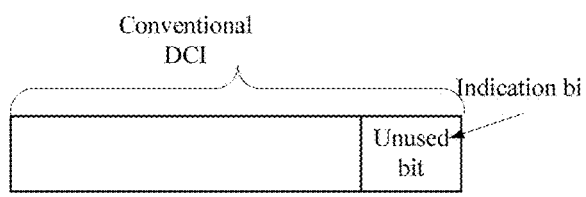

In the embodiment, the UE can decide, according to a notification from the MTC server, whether to perform the operations of the above steps S202-S204 on the first symbol stream. The notification may be explicit or implicit. In the case of an explicit notification, the MTC server can send, to the UE, information indicating whether to perform the code division multiplexing. The UE can perform the above-mentioned operations when receiving the information indicating that the code division multiplexing is to be performed, and does not perform the above-mentioned operations when receiving the information indicating that the code division multiplexing is not to be performed. For example, the information indicating whether to perform the code division multiplexing can be included in a physical downlink control channel (PDCCH). Specifically, the information can be included in downlink control information (DCI) (for example, DCI format 0, UL grant) in the PDCCH. In this case, an indication bit (for example, 1 bit) for indicating whether to perform the code division multiplexing can be added to traditional DCI, as shown in FIG. 6A, or an unused bit (for example, a transmission power control bit) in the DCI may be replaced with the indication bit, as shown in FIG. 6B. In the case of an implicit notification, the MTC server does not send the information indicating whether to perform the code division multiplexing, and instead, a modulation and coding scheme (MCS) index sent by the MTC server to the UE is used to notify whether to perform the code division multiplexing. Specifically, since the MCS index is associated with a modulation order, the UE can determine, according to the index, a modulation order that should be used, and then determine, according to the modulation order, whether to perform the operations of the above steps S202-S204. For example, when the modulation order corresponding to the MCS index is greater than a certain value (for example, 2), the UE can determine to perform the operations of the above steps S202-S204, otherwise can determine not to perform the operations of the above steps S202-S204. In the case of not performing the above-mentioned operations, processing, such as resource unit mapping processing and/or generating a SC-FDMA signal, may be performed on the first symbol stream, and data streams generated thereby are sent.

The embodiment of the present invention is described above in the context of the UE performing the data transmitting method. However, as described above, the method may also be performed by the MTC server. When there are data to be sent to the UE, the MTC server can process the data to be sent in manner which is the same as that described with reference to FIG. 2 to generate a code-division-multiplexed data stream, and send, after processing the code-division-multiplexed data stream, the processed data stream. In this case, the UE will perform a corresponding data receiving method, so as to recover, from the received data, the data sent by the MTC server.

A data receiving method according to an embodiment of the present invention is described below with reference to FIG. 7. Here, the description is made taking execution of the receiving method by the UE as an example. However, likewise, the method may also be performed by the MTC server, and at this time, the description made for the UE is also applied to the MTC server after appropriate adjustments.

Figure 7:
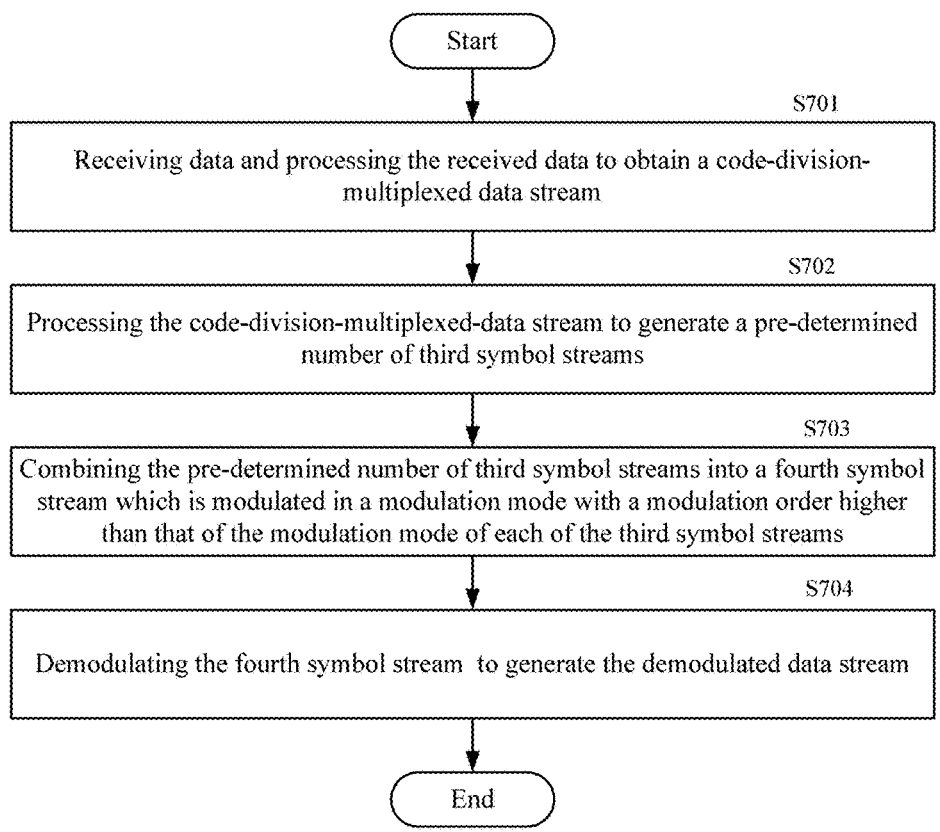
FIG. 7 shows a flow chart of a data receiving method according to an embodiment of the present invention.

As shown in FIG. 7, in step S701, the data can be received and the received data can be processed, so as to obtain a code-division-multiplexed data stream. The processing can be reverse processing corresponding to the processing performed in step S204, which can comprises, for example, OFDM demodulation or resource unit de-mapping, etc. If no processing is performed in step S204, and instead the code-division-multiplexed data stream was directly transmitted, in step S701, processing may not be performed, and instead, the received data are used as the code-division-multiplexed data stream directly.

Here, the UE can determine, according to the notification from the MTC server, whether the received data were generated from a code-division-multiplexed bit stream, so as to determine whether the respective steps described below should be performed. The notification may be explicit or implicit. In the case of the explicit notification, the MTC server can send, to the UE, information indicating whether the code division multiplexing was performed, so that the UE determines, when receiving the information indicating that the code division multiplexing was performed, that the received data were generated from the code-division-multiplexed bit stream and thereby determines to perform the following steps, and does not perform the steps described below when receiving the information indicating that the code division multiplexing was not performed. As stated above, the information indicating whether code division multiplexing was performed can be included in a PDCCH. For example, the information indicating whether code division multiplexing was performed can be included in DCI (for example, DCI format 1A, DL grant) of the PDCCH. In the case of the implicit notification, the UE can determine, according to an MCS index notified by the MTC server, whether the received data were generated from the code-division-multiplexed bit stream. For example, when a modulation order corresponding to the MCS index is greater than a certain value (for example, 2), the UE can determine that the received data were generated from the code-division-multiplexed bit stream. Where the received data were not generated from the code-division-multiplexed bit streams, the UE can process the data in a conventional manner.

In step S702, the code-division-multiplexed data stream can be processed, so as to generate a pre-determined number of symbol streams (referred to as third symbol streams hereinafter for convenience of description). Here, the pre-determined number is still represented as N. Briefly, the code-division-multiplexed data stream can be de-multiplexed, so as to generate N de-multiplexed data streams, and then symbol streams which have been repeated as a pre-determined unit (pre-determined repeating unit) for a pre-determined number of times (pre-determined number of repetition times, $N_R$) can be respectively extracted from the N de-multiplexed data streams, as the N third symbol streams. As stated above, the UE can receive, from a base station, information indicating N and information indicating $N_R$ via the RRC signalling. In addition, the pre-determined unit can be learnt in the above-mentioned manner. As stated above, the pre-determined unit may be a symbol or a sub-frame.

Specifically, firstly, the code-division-multiplexed data stream can be de-multiplexed, so as to generate N de-multiplexed data streams. For example, the code-division-multiplexed bit streams can be respectively multiplied by spreading sequences generated in the above-mentioned manner (i.e. the respective spreading sequences in the matrix mentioned above), so as to generate the N de-multiplexed bit streams.

Then, a symbol stream which has been repeated as a pre-determined repeating unit for $N_R$ times can be respectively extracted from each of the de-multiplexed data streams, as a corresponding third symbol stream. Specifically, since it has been known that each of the de-multiplexed data streams was obtained by repeating a certain symbol stream for $N_R$ times in a unit of the repeating unit, a reverse process of the repeating can be performed to extract the symbol stream so as to eliminate repeated data. For example, data of every $N_R$ repeating units (corresponding to one repetition group) in the de-multiplexed data stream can be extracted. Then, the data of the repetition group are averaged with respect to $N_R$ so as to determine data as a basic unit of the repetition group, then the data of basic units of the respective repetition groups are combined to obtain one symbol stream, i.e. a third symbol stream corresponding to the de-multiplexed data stream.

Still referring to FIG. 7, in step S703, the N third symbol streams are combined into a fourth symbol stream, which was modulated in a modulation manner with a modulation order higher than that of the modulation manner of each of the third symbol streams. In other words, N low-order-modulated symbol streams are combined into a high-order-modulated symbol stream.

Specifically, the above-mentioned combination operation can be performed according to a modulation manner of each of the third symbol streams and a modulation manner of the fourth symbol stream. The UE can know the modulation manner of each of the third symbol streams and the modulation manner of the fourth symbol stream in a manner described above with reference to FIG. 2, and details omitted. As an example, if there are two third symbol streams and their modulation manners are QPSK, and the modulation manner of the fourth symbol stream is 16QAM, first two bits can be extracted from a first QPSK symbol stream and first two bits can be extracted from a second QPSK symbol stream, and the four bits are combined to serve as bits of a first symbol of the fourth symbol stream. Then, third and fourth bits can be extracted from the first QPSK symbol stream, third and fourth bits can be extracted from the second QPSK symbol stream, and the four bits are combined to serve as bits of a second symbol of the fourth symbol stream, and so on, until all the bits of the first QPSK symbol stream and the second QPSK symbol stream are extracted.

Next, in step S704, the fourth symbol stream can be demodulated to generate the demodulated data stream. For the demodulated data, processing, such as descrambling, can be further performed on them if necessary, so as to recover the data sent from the MTC server.

[Variant]

Hereinbefore, the data transmitting method and the data receiving method according to the embodiments of the present invention are described in the context of the MTC system. It should be appreciated that this is merely illustrative, and the data transmitting method and the data receiving method may also be applied in a non-MTC system (in this case, the MTC server is replaced with a base station). In the variant, the operations of step S202 and step S703 are slightly different, and the other steps can remain unchanged. Specifically, in this case, the operation of repeating data (transmission side) and the operation of eliminating repeated data (receiving side) may not be performed. Hereinafter, the differences will be described and a description of the same contents will be omitted.

Specifically, at the time of sending data, for a non-MTC system, when the N second symbol streams are processed in step S203 to generate the code-division-multiplexed data stream, the processing can comprise the code division multiplexing but does not comprise the operation of repeating the data. In this case, the code division multiplexing can be performed on the N second symbol streams, so as to generate the code-division-multiplexed data stream. For example, the N second symbol streams can be respectively multiplied by mutually orthogonal spreading sequences, so as to generate N code sequences, then the N code sequences are combined to generate the code-division-multiplexed data stream.

At the time of receiving the data, for the non-MTC system, when the code-division-multiplexed data stream is processed in step S702 so as to generate the N symbol streams, the processing can comprise the de-multiplexing operation but does not comprise the above-mentioned operation of eliminating repeated data, i.e. the code-division-multiplexed data stream can be de-multiplexed, so as to directly obtain the N symbol streams. Similarly, the code-division-multiplexed data stream can be multiplied by the above-mentioned spreading sequences, so as to generate the N symbol streams.

Hereinafter, a data transmitting device according to an embodiment of the present invention is described with reference to FIG. 8. The data transmitting device can perform the above-mentioned data transmitting method. In addition, the data transmitting device may be located in the UE, or may be located in the MTC server or the base station. Hereinafter, the description is made in the case where the data transmitting device is located in the UE. In addition, since the operation performed by the data transmitting device is basically consistent with the above-mentioned data transmitting method, the description of the same contents is omitted herein to avoid repetition, and for these same contents, refer to the description given above.

Figure 8:
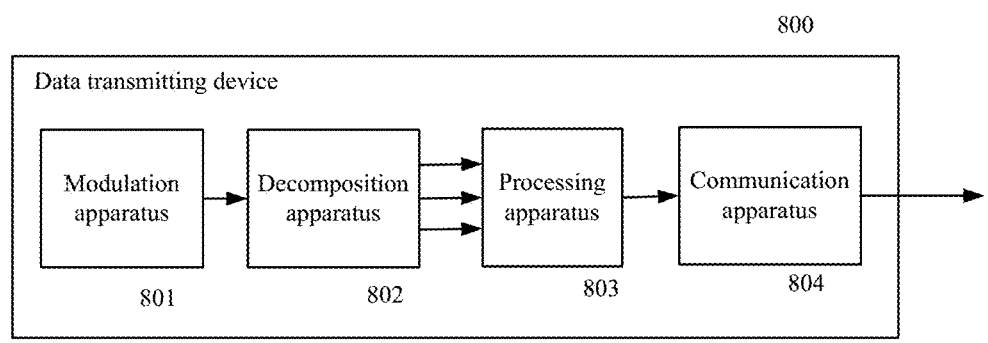
FIG. 8 shows a block diagram of a data transmitting device according to an embodiment of the present invention.

As shown in FIG. 8, the data transmitting device 800 comprises a modulation apparatus 801, a decomposition apparatus 802, a processing apparatus 803 and a communication apparatus 804. The communication apparatus 804 can communicate with the MTC server to receive/send various pieces of information and/or data streams described below.

The modulation apparatus 801 can modulate the data in a first modulation manner to generate a first symbol stream. The data described herein may be data generated by scrambling MTC service data to be sent, in which case a scrambling apparatus (not shown) can be arranged in the data transmitting device 800. Of course, the data may also be other types of data. In addition, the first modulation manner may be a high-order modulation manner, for example, a modulation manner with a modulation order greater than 2, and may be, for example, QPSK, 16QAM, 64QAM, or the like. The selection of the first modulation manner may be performed by the data transmitting device 800 (specifically, the modulation apparatus 801) and notified to the MTC server via the communication apparatus 804, or may also be performed by the MTC server and notified to the data transmitting device 800. Alternatively, the first modulation manner can be set in advance in the MTC server and the UE.

The decomposition apparatus 802 can decompose the first symbol stream into a pre-determined number (N) of second symbol streams. Each of the second symbol streams is modulated in a modulation manner with a modulation order lower than that of the first modulation manner. N can be determined in the above-mentioned manner. In addition, N can be determined by the MTC server, and information indicating N is sent to the data transmitting device 800 via semi-static signalling, such as RRC signalling, or other signalling, so that the data transmitting device 800 (specifically, the communication apparatus 804) receives the information indicating N via the RRC signalling. Alternatively, N can be determined by the data transmitting device 800, and is notified to the MTC server via appropriate signalling. In addition, modulation manners of the respective second symbol streams can be determined in the above-mentioned manner, where the modulation manners of the respective second symbol streams may be the same, or may be different. The modulation manners of the respective second symbol streams may be determined by the MTC server, and are notified to the data transmitting device 800 via various signalling, such as the RRC signalling. The modulation manners of the respective second symbol streams may also be determined by the data transmitting device 800 (specifically, the decomposition apparatus 802), and are notified to the MTC server via signalling.

The decomposition apparatus 802 can decompose the first symbol stream according to the pre-determined number N and the modulation manners of the respective second symbol streams. For example, the decomposition apparatus 802 can perform decomposition in a manner described above with reference to FIG. 2, and a detailed description thereof is omitted herein for simplicity.

The processing apparatus 803 can process the N second symbol streams, so as to generate a code-division-multiplexed data stream. Each of the second symbol streams corresponds to a layer of code division multiplexing. In the embodiment, the processing can comprise repeating and the code division multiplexing. Briefly, the processing apparatus 803 can respectively repeat the N second symbol streams in a pre-determined unit for a pre-determined number of times, so as to generate N repeated symbol streams. Then, the processing apparatus 803 can perform the code division multiplexing on the N repeated symbol streams, so as to generate the code-division-multiplexed data stream.

Specifically, the processing apparatus 803 can respectively repeat each of the second symbol streams in a unit of a pre-determined unit (i.e. pre-determined repeating unit) for a pre-determined number of times (i.e. pre-determined number of repetition times $N_R$), so as to generate a corresponding repeated symbol stream. The pre-determined repeating unit may be a symbol, or may be a sub-frame. In each repeated symbol stream, $N_R$ repeating units form a repetition group. As stated above, the pre-determined repeating unit and/or the pre-determined number of repetition times $N_R$ can be determined by the MTC server, and the data transmitting device 800 can be notified of information indicating the pre-determined repeating unit and/or information indicating the pre-determined number of repetition times via semi-static signalling, such as RRC signalling, or other signalling, so that the data transmitting device 800 (specifically, the communication apparatus 804) receives the information indicating the pre-determined repeating unit and/or the information indicating the pre-determined number of repetition time via the signalling. Alternatively, the pre-determined repeating unit and/or the pre-determined number of repetition times can be determined by the data transmitting device 800 (specifically, the processing apparatus 803), and is notified to the MTC server via signalling. Or, the pre-determined repeating unit and/or the pre-determined number of repetition times can be set in advance in the MTC server and the data transmitting device 800.

After the N repeated symbol streams are obtained, the processing apparatus 803 can perform the code division multiplexing on the N repeated symbol streams, so as to generate the code-division-multiplexed data stream. Specifically, the processing apparatus 803 can multiply each repeating unit in repetition groups in each repeated symbol stream by a corresponding spreading sequence, so as to generate a data stream of a corresponding code division multiplexing layer, then the data streams of the respective code division multiplexing layers can be combined to generate the code-division-multiplexed data stream. The spreading sequence corresponding to each repeating unit in the repetition groups in each repeated symbol stream can be determined in the above-mentioned manner, and a detailed description thereof is omitted herein in order to avoid repetition.

The communication apparatus 804 can communicate with the MTC server, so as to send or receive information/data. For example, the communication apparatus 804 can receive information indicating the first modulation manner and information indicating the modulation manners of the respective second symbol streams. The communication apparatus 804 can also receive, via RRC signalling or other signalling, information indicating the pre-determined number N and information indicating the number of repetition times $N_R$.

In addition, the communication apparatus 804 can also process the code-division-multiplexed data stream and send the processed data streams. The processing to be performed can be selected according to actual requirements, for example, resource unit mapping processing and/or the processing for generating a SC-FDMA signal. In this case, a corresponding unit (not shown) can be arranged in the communication apparatus 804 to perform these processing.

In addition, as stated above, the data transmitting device 800 (specifically, the respective apparatuses therein) can decide, according to a notification from the MTC server, whether to perform the above-mentioned operations on the first symbol stream. The notification may be explicit or implicit. In the case of an explicit notification, the MTC server can send, to the data transmitting device 800, information indicating whether to perform the code division multiplexing. In this case, the communication unit 804 can receive the information indicating whether to perform the code division multiplexing. The data transmitting device 800 can perform the above-mentioned operations when receiving the information indicating that the code division multiplexing is to be performed, and does not perform the above-mentioned operations when receiving the information indicating that the code division multiplexing is not to be performed. As stated above, the information indicating whether to perform the code division multiplexing can be included in a PDCCH. Specifically, the information can be included in DCI (for example, DCI format 0, UL grant) of the PDCCH. In the case of an implicit notification, the data transmitting device 800 can use, as stated above, an MCS index sent by the MTC server to the UE to notify whether to perform the code division multiplexing.

In the above-mentioned transmitting device, a symbol stream modulated in a high-order modulation manner can be converted into a plurality of symbol streams modulated in a low-order modulation manner, then the plurality of symbol streams are sent in a code division multiplexing manner. Since the low-order modulated symbol stream has a higher reliability than the high-order modulated symbol stream, and orthogonality is introduced via the orthogonal spreading sequences when performing the code division multiplexing, the reliability for data transmission can be improved, and the number of times for repeated transmission is reduced.

As stated above, the MTC server can perform the data transmitting method described with reference to FIG. 2 to process the data to be sent, generate the code-division-multiplexed data stream, and send, after processing the code-division-multiplexed data stream, the processed data stream. In this case, a data receiving device can be arranged in the UE, so as to recover from the received data the data sent by the MTC server.

Hereinafter, a data receiving device according to an embodiment of the present invention is described with reference to FIG. 9. Here, the description is made taking that the receiving device is located in the UE as an example. However, the data receiving device can also be applied to the MTC server after appropriate adjustments.

Figure 9:
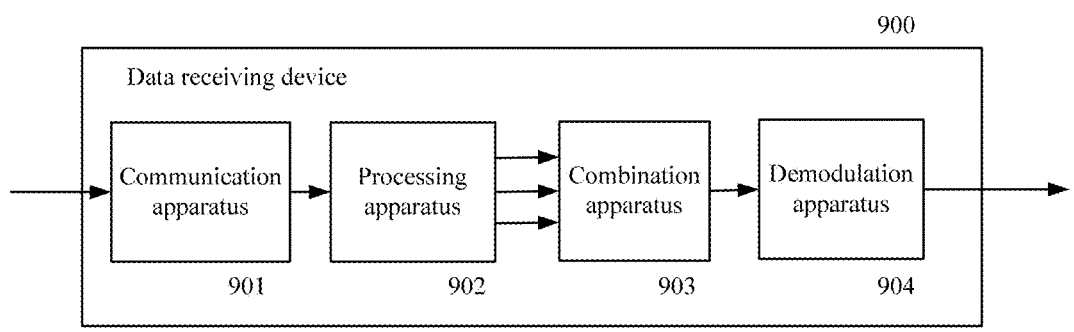
FIG. 9 shows a block diagram of a data receiving device according to an embodiment of the present invention.

As shown in FIG. 9, the data receiving device 900 comprises a communication apparatus 901, a processing apparatus 902, a combination apparatus 903 and a demodulation apparatus 904.

The communication apparatus 901 can receive the data and process the received data, so as to obtain the code-division-multiplexed data stream. The processing can comprises OFDM demodulation or resource unit de-mapping, etc. In this case, a corresponding unit (not shown) can be arranged in the communication apparatus 901 to perform these processing.

In addition, as stated above, the data receiving device 900 can determine, according to the notification from the MTC server, whether the received data were generated from a code division multiplexed bit stream, so as to determine whether respective operations described below should be performed. The notification may be explicit or implicit. In the case of an explicit notification, the MTC server can send, to the UE (specifically, the data receiving device 900), information indicating whether the code division multiplexing was performed. The communication apparatus 901 can receive the information. When receiving the information indicating that the code division multiplexing was performed, the data receiving device 900 can determine that the received data were generated from the code-division-multiplexed bit stream, and thus determine to perform the following operations, whereas when receiving the information indicating that the code division multiplexing was not performed, the data receiving device 900 can determine not to perform the following operations. As stated above, the information indicating whether the code division multiplexing was performed can be included in a PDCCH, for example, the information indicating whether the code division multiplexing was performed can be included in DCI (for example, DCI format 1A, DL grant) of the PDCCH. In the case of an implicit notification, the data receiving device 900 can determine whether the received data were generated from the code-division-multiplexed bit stream according to an MCS index notified by the MTC server in the above-mentioned manner.

The processing apparatus 902 can process the code-division-multiplexed data stream, so as to generate a pre-determined number (N) of third symbol streams. Briefly, the processing apparatus 902 can de-multiplex the code-division-multiplexed data stream, so as to generate N de-multiplexed data streams, and then can respectively extract symbol streams which have been repeated as a pre-determined unit (pre-determined repeating unit) for a pre-determined number of times (pre-determined number of repetition times, $N_R$) from the N de-multiplexed data streams to serve as N third symbol streams. As stated above, the data receiving device 900 (specifically, the communication apparatus 901) can receive, from a base station, the information indicating N and the information indicating $N_R$ via the RRC signalling. In addition, the data receiving device 900 can learn the pre-determined unit in the above-mentioned manner. As stated above, the pre-determined unit may be a symbol or a sub-frame.

Specifically, the processing apparatus 902 can de-multiplex the code-division-multiplexed data stream, so as to generate N de-multiplexed data streams. For example, the code division multiplexed bit stream can be multiplied by the spreading sequences generated in the above-mentioned manner (i.e. the respective spreading sequences in the matrix mentioned above) respectively, so as to generate the N de-multiplexed bit streams. Then, the processing apparatus 902 can respectively extract from each of the de-multiplexed data streams, in a manner described above with reference to FIG. 7, a symbol stream which has been repeated as a pre-determined repeating unit for $N_R$ times, to serve as a corresponding third symbol stream. For example, the processing apparatus 902 can extract data of every $N_R$ repeating units (corresponding to one repetition group) in the de-multiplexed data stream, averages the data of the repetition group with respect to $N_R$ so as to determine data as a basic unit of the repetition group, and then combine the data of basic units of the respective repetition groups to obtain one symbol stream, i.e. a third symbol stream corresponding to the de-multiplexed data stream.

The combination apparatus 903 can combine the N third symbol streams into a fourth symbol stream, where the fourth symbol stream is modulated in a modulation manner with a modulation order higher than that of the modulation manner of each of the third symbol streams. In other words, N low-order-modulated symbol streams are combined into one high-order-modulated symbol stream. Specifically, the combination apparatus 903 can perform, in the above-mentioned manner, the above-mentioned combination operation according to a modulation manner of each of the third symbol streams and a modulation manner of the fourth symbol stream.

The demodulation apparatus 904 can demodulate the fourth symbol stream, so as to generate the demodulated data stream. Processing, such as descrambling, can be performed on the demodulated data if necessary, so as to recover the data sent from the MTC server. In this case, a corresponding unit (not shown) can be arranged in the demodulation apparatus 904 to perform the processing.

[Variant]

Similarly, the above-mentioned data transmitting device and the data receiving device described in the context of the MTC system may also be applied in a non-MTC system. In this variant, the operations performed by the processing apparatus 803 of the above-mentioned data transmitting device and by the processing apparatus 902 of the data receiving device are slightly different, and other apparatuses can remain unchanged. Hereinafter, only the differences will be described and a description of the same contents will be omitted.

For the data transmitting device, when the processing apparatus 803 processes the N second symbol streams so as to generate the code-division-multiplexed data stream, the processing can comprise the code division multiplexing but does not comprise the operation of repeating the data. In this case, the processing apparatus 803 can perform the code division multiplexing on the N second symbol streams to generate the code-division-multiplexed data stream.

For the data receiving device, when the processing apparatus 902 processes the code-division-multiplexed data stream so as to generate the N symbol streams, the processing can comprise the de-multiplexing operation but does not comprise the above-mentioned operation of eliminating repeated data, i.e. the processing apparatus 902 can de-multiplex the code-division-multiplexed data stream to directly obtain the N symbol streams.

The embodiments of the present invention have been described above, and it should be recognized that these descriptions are merely illustrative and not limiting. For example, although numbers, such as "first", "second", "third" and "fourth" are used above, it should be understood that such numbers are merely for distinguishing corresponding objects, but not limiting these objects themselves or the sequence thereof. Various objects can be numbered in other manners if necessary.

Although the exemplary embodiments of the present invention have been shown and described, it should be understood by a person skilled in the art that various changes in form and detail may be made to these exemplary embodiments without departing from the scope and spirit of the present invention defined in the claims and their equivalents.

The invention claimed is:

1. A data transmitting method, comprising:
    modulating data in a first modulation manner to generate a first symbol stream;
    decomposing the first symbol stream into a pre-determined number of second symbol streams, each of which is modulated in a modulation manner with a modulation order lower than that of the first modulation manner;
    processing the pre-determined number of second symbol streams to generate a code-division-multiplexed data stream, wherein the processing the pre-determined number of second symbol streams to generate a code-division-multiplexed data stream comprises:
        repeating the pre-determined number of second symbol streams in a pre-determined unit for a pre-determined number of times respectively, to generate a pre-determined number of repeated symbol streams; and
        performing code division multiplexing on the pre-determined number of repeated symbol streams to generate the code-division-multiplexed data stream;
    receiving, via radio resource control signalling, information indicating the pre-determined number of times; and
    processing the code-division-multiplexed data stream to send the processed data stream.

2. The method of claim 1, wherein the processing the pre-determined number of second symbol streams to generate a code-division-multiplexed data stream comprises:
    performing code division multiplexing on the pre-determined number of second symbol streams to generate the code-division-multiplexed data stream.

3. The method of claim 1, wherein the pre-determined unit is a symbol or a sub-frame.

4. The method of claim 1, further comprising:
    receiving, via a downlink control channel, information indicating that the code division multiplexing is to be performed, and receiving, via radio resource control signalling, information indicating the pre-determined number.

5. A data receiving method, comprising:
    receiving data and processing the received data to obtain a code-division-multiplexed data stream;
    processing the code-division-multiplexed data stream to generate a pre-determined number of first symbol streams, wherein the processing the code-division-multiplexed data stream to generate a pre-determined number of first symbol streams comprises:
        de-multiplexing the code-division-multiplexed data stream to generate a pre-determined number of de-multiplexed data streams; and
        extracting, from the pre-determined number of de-multiplexed data streams, symbol streams which have been repeated as a pre-determined unit for a pre-determined number of times respectively, as the pre-determined number of first symbol streams;
    receiving, via radio resource control signalling, information indicating the pre-determined number of times;
    combining the pre-determined number of first symbol streams into a second symbol stream, wherein the second symbol stream is modulated in a modulation manner with a modulation order higher than that of each of the first symbol streams; and demodulating the second symbol stream to generate a demodulated data stream.

6. The method of claim 5, wherein the processing the code-division-multiplexed data stream to generate a pre-determined number of first symbol streams comprises:
de-multiplexing the code-division-multiplexed data stream to generate a pre-determined number of de-multiplexed data streams, as the pre-determined number of first symbol streams.

7. The method of claim 5, wherein the pre-determined unit is a symbol or a sub-frame.

8. The method of claim 5, further comprising:
receiving, via a physical downlink control channel, information indicating that the code division multiplexing has been performed, and receiving, via radio resource control signalling, information indicating the pre-determined number.

9. A data transmitting device, comprising:
a modulation apparatus configured to modulate data in a first modulation manner to generate a first symbol stream;
a decomposing apparatus configured to decompose the first symbol stream into a pre-determined number of second symbol streams, each of which is modulated in a modulation manner with a modulation order lower than that of the first modulation manner;
a processing apparatus configured to process the pre-determined number of second symbol streams to generate a code-division-multiplexed data stream, wherein the processing apparatus is configured to repeat the pre-determined number of second symbol streams in a pre-determined unit for a pre-determined number of times respectively, to generate a pre-determined number of repeated symbol streams, and perform code division multiplexing on the pre-determined number of repeated symbol streams to generate the code-division-multiplexed data stream; and
a communication apparatus configured to process the code-division-multiplexed data stream to send the processed data stream, wherein
the communication apparatus is further configured to receive, via radio resource control signalling, information indicating the pre-determined number of times.

10. The transmitting device of claim 9, wherein the processing apparatus is configured to perform code division multiplexing on the pre-determined number of second symbol streams to generate the code-division-multiplexed data stream.

11. The transmitting device of claim 9, wherein the pre-determined unit is a symbol or a sub-frame.

12. The transmitting device of claim 9, wherein the communication apparatus is further configured to receive, via a downlink control channel, information indicating that code division multiplexing is to be performed, and receive, via radio resource control signalling, information indicating the pre-determined number.

* * * * *